United States Patent [19]

Erhard

[11] Patent Number: 4,589,641

[45] Date of Patent: May 20, 1986

[54] DEVICE FOR CLOSING UP THE GROOVES IN THE TABLE OF A MACHINE SAW

[75] Inventor: Raymond Erhard, Willer-sur-Thur, France

[73] Assignee: SMID S.A., Lutterbash, France

[21] Appl. No.: 726,425

[22] Filed: Apr. 24, 1985

[30] Foreign Application Priority Data

Apr. 24, 1984 [FR] France .............................. 84 06544

[51] Int. Cl.⁴ ............................................... B23Q 3/00
[52] U.S. Cl. .................................. 269/289 R; 83/398; 83/409
[58] Field of Search ................................ 83/398, 409; 269/295–302, 13, 14, 289

[56] References Cited

U.S. PATENT DOCUMENTS 2,676,413  4/1954  Wharton et al. ............... 269/297 X
4,077,290  3/1978  Hreha .............................. 269/301 X Primary Examiner—Frank T. Yost
Attorney, Agent, or Firm—Robert E. Burns; Emmanuel J. Lobato; Bruce L. Adams

[57] ABSTRACT

The invention relates to a device for closing up the grooves in the tops of the front and rear tables of a machine for sawing materials in sheets, these grooves being perpendicular to the sawing-line. This closing device is characterized by the fact that it comprises, for each groove (9), an obturator (13) activated by means of propulsion (20, 21, 34) and subjected to a vertical course to fit into the groove (9) of the table (5, 6).

9 Claims, 2 Drawing Figures

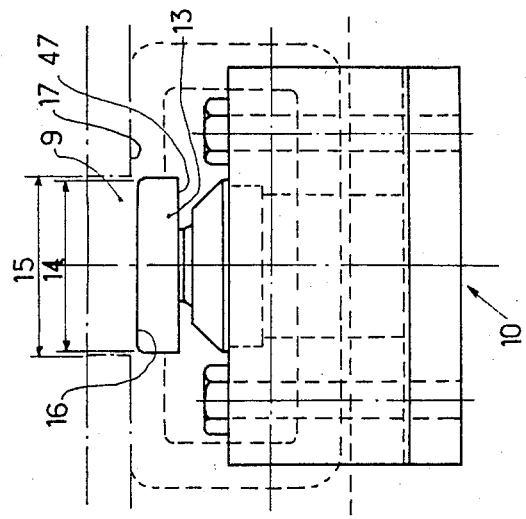
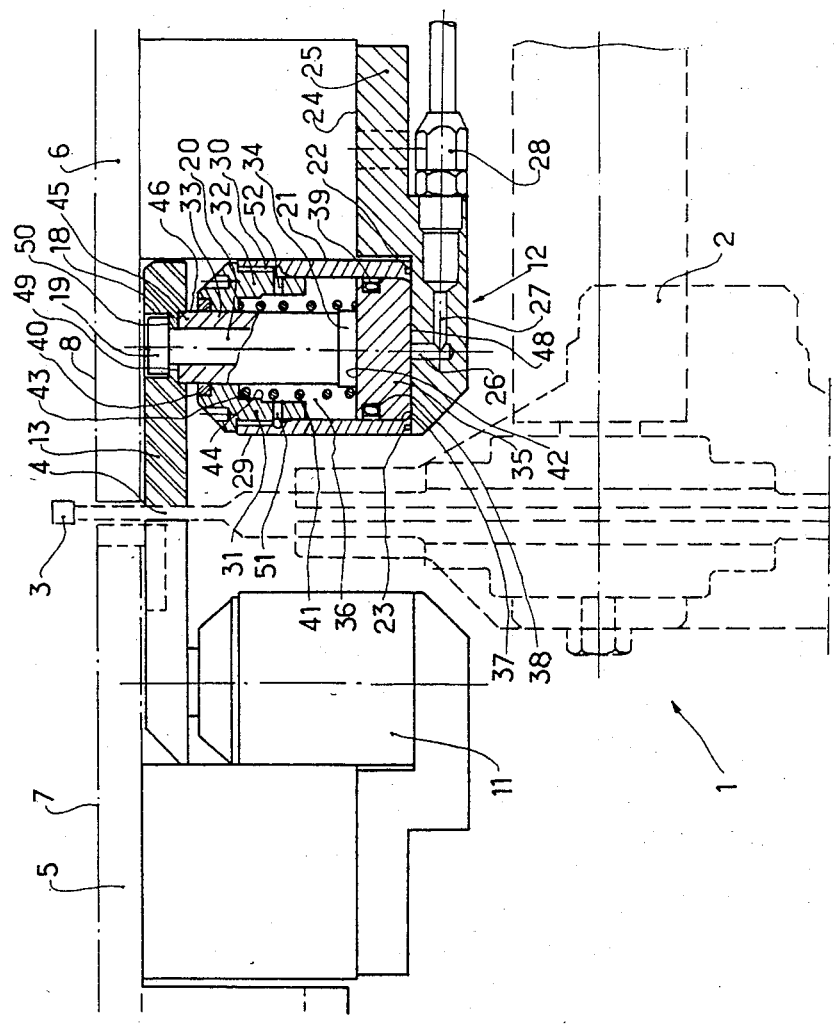

DEVICE FOR CLOSING UP THE GROOVES IN THE TABLE OF A MACHINE SAW

The invention relates to a device for closing up the grooves made in the tops of the front and rear tables of a machine saw for cutting materials in sheets, these grooves being perpendicular to the sawing-line.

For cutting materials in sheets, we already know machine saws comprising a chassis, a table in front of the saw blade drawn along by a sawing carriage and a table behind this same saw blade. Generally speaking, for cutting materials in sheets, a certain number of sheets are piled up, and the pile of sheets is held in place by clamps disposed at one of the transversal extremities of this pile. These clamps are activated by a guide, and this pushes the pile of sheets ahead as they are cut. These clamps are composed of an upper jaw gripping on the top of the pile, and a lower jaw against which the pile of sheets is pressed by the upper jaw. Depending on the breadth of the sheets, the machine saw may comprise several clamps disposed in parallel to the median plane of the machine saw. The lower jaw(s) move(s) in parallel grooves made in the table in front and in the table behind. At the place where these grooves are situated, the pile of sheets is not held in place, especially near the saw blade. Now, depending on certain cutting conditions determined by the materials constituting the sheets and/or the type of saw blade, this opening may adversely affect the quality of the cut and the life of the saw blade.

The object of this invention is to obviate these disadvantages, and the proposal is to close the grooves in the tables in front and behind, in which the lower jaws of the clamps travel.

For this purpose, the invention concerns a device for closing up the grooves in the tops of the tables in front of and behind a machine saw for sawing materials in sheets, these grooves being perpendicular to the sawing-line, the device being characterized by the fact that it comprises, for each groove, an obturator activated by means of propulsion and subjected to a vertical course to fit into the groove in the table. Thus, at the place of the grooves for the passage of the lower jaws of the clamps, the pile of materials in sheets is held firm over the whole of its breadth.

The invention will be clearly understood by referring to the description below which is given as a non-limitative example, and to the attached drawing, in which:

FIG. 1 is a view in elevation of a table of a machine saw comprising, in conformity with the invention, devices for closing the grooves in the tables in front and behind, one of the devices being shown in external view, and the other in section.

FIG. 2 is a view from the left of one of the closing devices.

REFERRING TO THE TWO FIGURES

The machine saw 1 comprises a sawing carriage 2 provided with a saw blade 3. This saw blade 3 traverses a sawing-line 4 separating a front table 5 from a rear table 6. In the tops 7, 8 of the tables in front 5 and behind 6, there are grooves 9 to allow the passage of the lower jaws of the clamps (not shown). The different grooves 9 are parallel to the longitudinal median plane of the machine saw 1. Near the sawing-line 4, the machine saw 1 has devices 10 which allow the grooves 9 to be closed. The number of devices 10 depends on the number of grooves 9, it being understood that each device 10 is composed of two identical groups 11, 12.

Only one of these groups, 11, will be described below.

It comprises an obturator 13 whose breadth 14 is slightly less that the breadth 15 of the grooves 9. This obturator 13 is subjected to a vertical course composed of a high point and a low point. When the obturator 13 is at the high point, its underneath 16 is flush with the tops 7, 8 of the tables in front 5 and behind 6. When the obturator 13 is at the low point, its top 16 is slightly lower than the bottom 17 of the tables in front 5 and behind 6, so as not to hamper the displacement of the lower jaw of the clamps. In the underneath 16 of the obturator 13, an orifice 18 is made in which the head 19 of a return shaft 20 is sunk. This return shaft 20 fits into the means of propulsion which are preferably pneumatic.

These means of propulsion consist of a pneumatic jack 21 the lower edge 22 of which, fitted with a sealing element 23, is integral with the underneath 24 of a support 25. In this support there are channels 26, 27 for the circulation of the compressed air feeding the pneumatic jack 21. These channels 26, 27 are linked by a connector 28 to the compressed air network of the machine saw 1. The upper extremity 29 of the pneumatic jack 21 has a threaded hole 30 into which the threaded extremity 31 of a cover 32 is screwed. This cover 32 has a central orifice 33 permitting the passage of a piston 34 in which is housed the return shaft 20. This shaft moves integrally with the piston 34. The piston has a head 35 which slides in the bore 36 of the pneumatic jack 21. In the circumference 37 of the head 35 there is a groove 38 in which a sealing ring 39 is housed. Moreover, the cover 32 also has a sealing joint 40 ensuring the tightness between the cover 32 and the piston 34. Over the piston, an elastic element 41 is slipped, disposed between the upper face 42 of the head 35 of the piston 34 and the bottom 43 of a bore 44 made in the cover 32. The upper extremity 45 of the piston 34 fits into a housing 46 made in the lower face 47 of the obturator 13.

The closing device 10 works as follows:

Compressed air is brought into the pneumatic jack 21 via the channels 26, 27. This compressed air exercises a pressure on the underneath 48 of the head 35 of the piston 34, and pushes the piston upwards. During its travel, the piston 34 compresses the elastic element 41 and the upper extremity 45 exercises a thrust on the bottom 49 of the housing 46. This causes the vertical displacement upward of the obturator 13 so that the top 16 of it is flush with the tops 7, 8 of the front 5 and rear 6 tables. By stopping the arrival of the compressed air, and opening up this arrival to the outside air, the air shut in the jack 21 is expelled by the action of the elastic element 41 which expands by exercising a downward thrust on the upper face 42 of the head 35 of the piston 34. So as not to put the top of the piston in depression, holes 51, 52 are provided in the cover 32, allowing free air to penetrate into the jack 21. The jack comes back into the position of rest, by exercising traction on the return axis 20. The head 19 of this axis exercises traction on the bottom 50 of the orifice 18. This causes the removal of the obturator 13 and liberates the groove 9 so that the lower jaw of the clamp can move.

Although the invention has been described in terms of a particular form of implementation, it is naturally not limited in any way, and various modifications can be made of shapes, materials, and combinations of these different elements without departing from the framework and the spirit of the invention.

I claim:

1. Device for closing up the grooves in the tops of the front and rear tables of a machine for sawing materials in sheets, these grooves being perpendicular to the sawing-line, characterized by the fact that it comprises for each groove (9) an obturator (13) activated by means of propulsion (20, 21, 34) and subjected to a vertical course to fit into the groove (9) of the table (5, 6).

2. Device for closing up the grooves according to claim 1, characterized by the fact that the means of propulsion are constituted by a return shaft (20) whose head (19), housed in an orifice (18) made in the top (16) of the obturator (13) exercises traction on the bottom (50) of this orifice (18) to give the obturator (13) its low position.

3. Device for closing up the grooves according to claim 1, characterized by the fact that the means of propulsion consist of a pneumatic jack (21), integral with a support (25), whose piston (34) moves integrally with the return shaft (20).

4. Device for closing up the grooves according to claim 1, characterized by the fact that the pneumatic jack (21) comprises an elastic element (41) interposed between the head (35) of the piston (34) and the bottom (43) of a bore (44) made in a cover (32) which obturates the pneumatic jack (21).

5. Device for closing up the grooves according to claim 1, characterized by the fact that the elastic element (41) is in the rest position when the obturator (13) is in the withdrawn position.

6. Device for closing up the grooves according to claim 1, characterized by the fact that the elastic element (41) is in the action position when the obturator (13) is in the high position.

7. Device for closing up the grooves according to claim 1, characterized by the fact that the obturator (13) has a breadth slightly less than the breadth (15) of the groove (9).

8. Device for closing up the grooves according to claim 1, characterized by the fact that the vertical course is such that when the obturator (13) is in the top position, its top (16) is flush with the tops (7, 8) of the tables (5, 6), and that in the low position, this top is below the bottoms (17) of the tables (5, 6).

9. Device for closing up the grooves according to claim 1, characterized by the fact that the cover (32) has holes (51, 52) through which free air can be introduced into the pneumatic jack (21).

* * * * *